Feb. 24, 1942.   B. T. MORGAN ET AL   2,274,154

UNIVERSAL JOINT

Filed April 29, 1940

INVENTORS.
Albert K. A. Christian
Benjamin T. Morgan
BY
ATTORNEYS

Patented Feb. 24, 1942

2,274,154

UNITED STATES PATENT OFFICE 2,274,154

UNIVERSAL JOINT

Benjamin T. Morgan and Albert K. A. Christian, Kansas City, Mo.; said Christian assignor to said Morgan Application April 29, 1940, Serial No. 332,256

9 Claims. (Cl. 64—15)

This invention relates to universal joints of the character employed between a source of power and the work and the primary object is to provide such a unit wherein is incorporated novel and unique means for permitting angularity of desired amounts without the attendant wearing or loss of power usually experienced.

One of the important aims of this invention is the provision of a joint of the aforementioned character having as a part thereof, a plurality of coil springs arranged in circumscribing relation with each other, about a common axis, and having therebetween fillers of resilient material which combine to create a compact, yieldable member capable of bending as power is imparted thereto.

A yet further aim of this invention is to provide a universal joint wherein is incorporated a number of coil springs wound in different directions and having interposed therebetween, fillers of resilient material such as rubber or the like, overlaid with sheets of fabric the nature of which overcomes friction, all to the end that power may be transmitted without heating and without friction.

Other important objects of the invention will appear during the course of the following specification, referring to the accompanying drawing wherein.

Figure 1:
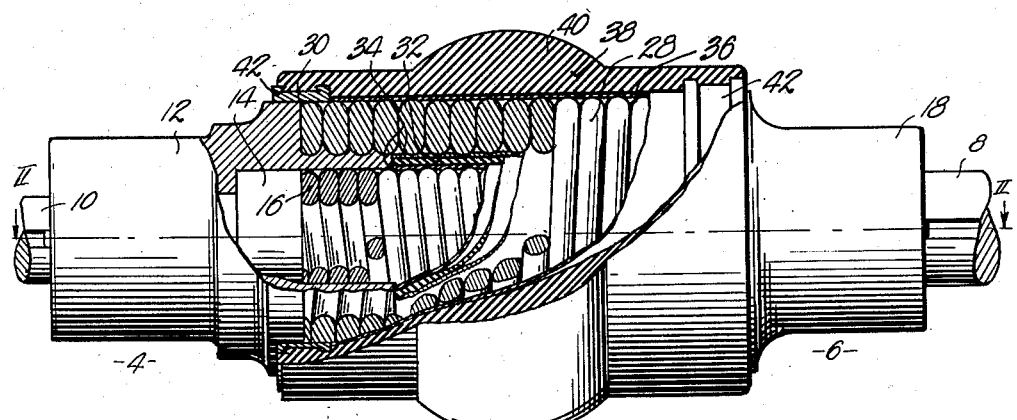
Figure 1 is a side elevational view of a universal joint made to embody this invention, parts being broken away to reveal relation of elements.

The invention contemplates bringing together in a unique manner, a number of coil springs and fillers of yieldable material so that the joint body is relatively solid and without spaces between the parts thereof.

In the preferred embodiment, two heads indicated generally by the numerals 4 and 6 respectively, are arranged to be attached to a source of power and to the work. In the instance illustrated, head 6 is joined to drive shaft 8 while head 4 is connected to a driven shaft 10. These shafts 8 and 10 are shown for purpose of illustration only and indicate that the joint may be interposed between a source of power and the work in any desired manner.

Head 4 comprises a fitting 12 and a fixture 14, the latter being circumscribed by the former so as to provide a space within which is positioned the end of inner spring 16. The other head 6 comprises a fitting 18 and a fixture 20 between which the other end of inner spring 16 is secured.

Fixtures 14 and 20 are joined together by a flexible cable 22 about which is disposed a unitary tubular filler 24, the ends of which preferably abut the inner ends of fixtures 14 and 20.

A sheet of fabric in the nature of chrome-tanned leather 26 lies between filler 24 and the inner surface of coil spring 16. Outer coil spring 28 is welded or otherwise secured as at 30 to fittings 12 and 18.

The inside diameter of outer spring 28 is slightly greater than the outside diameter of inside spring 16, which permits introducing another unitary resilient cylindrical filler 32 between inner spring 16 and outer spring 28.

Sheets of chrome-tanned leather 34, or such fabric as will overcome friction, are interposed between springs 16 and 28 and cylindrical filler 32. Cylindrical filler 32 has its ends abutting the inner ends of fittings 12 and 18 so that the space between the inner surface of outer spring 28 and the outer surface of spring 16 is completely filled with yieldable resilient substance.

A sheet of leather or the like 36 extends around the outer face of spring 28 to prevent undue friction between said spring 28 and the resilient case 38. This case 38 is formed of rubber which is yieldable and pliable yet strong enough to assist springs 16 and 28 in maintaining heads 4 and 6 in alignment. This case 38 is thickened at its central portion between the ends as at 40 so that when the entire body of the universal joint is bent to an angled position "puckering" will not occur and the case will serve as an effective housing free from strain and susceptible of altering its length as the joint is flexed.

Resilient case 38 is anchored to heads 4 and 6 through the medium of rings 42, each of which is pressed into place so as to overhang the end coils respectively of outer spring 28.

Figure 2:
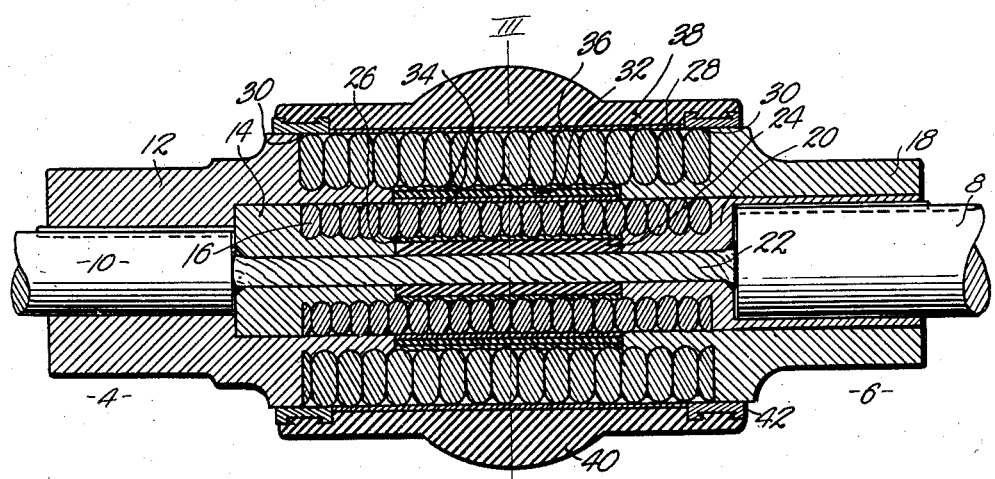
Fig. 2 is a longitudinal sectional view through the joint taken on line II—II of Fig. 1.
Figure 3:
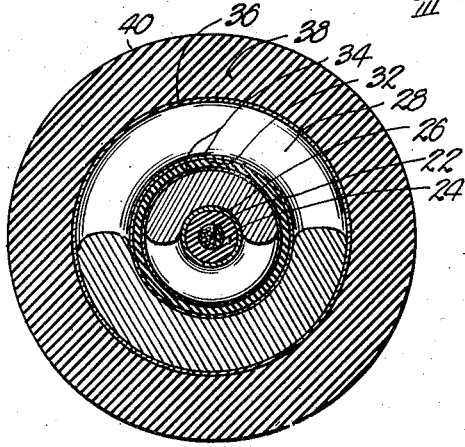
Fig. 3 is a transverse central sectional view through the joint taken on line III—III of Fig. 2.

Graphite or other suitable lubricant is placed in the interstices of the several coils of both springs when the universal joint is assembled and after the parts are secured together as above described and illustrated, particularly in Figs. 1 and 2. It will be obvious that no leakage of the lubricant can occur and that as spaces are formed the lubricant will work between the surfaces of adjacent coils of the two springs.

In actual work, springs 16 and 28 are wound in opposite directions. The outer spring is wound so that as torque is imparted to the joint, said outer spring 28 will have a tendency to tighten. Inner spring 16 is wound in the opposite direction so that as such torque is applied, the inner spring will have a tendency to unwind to a slight degree.

In the event of accidental parting of either spring 16 or 28, cable 22 becomes a medium to insure that heads 4 and 6 will not be pulled from each other to set up a dangerous condition. Inner spring 16 is welded to fixtures 14 and 20 and both springs 16 and 28 have the coils at the ends thereof resting in grooved inwardly directed flanges to strenthen the anchor between the springs and said heads. Springs 16 and 28 are relatively short and strong yet capable of allowing the joint to interconnect shafts such as 8 and 10 that are disposed at an angle to each other.

The invention contemplates specific embodiments of a nature different from that shown in the drawing and therefore, it is desired to be limited only by the scope of the appended claims.

Having thus described the invention, what is claimed as new and desired to be secured by Letters Patent is:

1. A joint of the character described comprising a pair of spaced apart heads adapted respectively to engage a source of power and the work; a plurality of coil springs in telescoped relation having their ends secured to the heads and maintaining the same in spaced apart relation; the outside diameter of the inner spring being smaller than the inside diameter of the outer spring whereby to provide a space between adjacent springs; and a filler of resilient material in said space.

2. A joint of the character described comprising a pair of spaced apart heads adapted respectively to engage a source of power and the work; a plurality of coil springs in telescoped relation having their ends secured to the heads and maintaining the same in spaced apart relation; the outside diameter of the inner spring being smaller than the inside diameter of the outer spring whereby to provide a space between adjacent springs; and a filler of resilient material in said space, adjacent springs having the coils thereof wound in opposite directions whereby upon application of torque certain of said springs will tend to unwind as the remaining springs tend to wind, said heads being joined by a flexible cable extending axially through the innermost coil spring, there being a cylindrical member circumscribing the portion of the cable between the heads, said member being between the outer face of the cable and the inner face of said innermost spring.

3. A joint of the character described comprising a pair of spaced apart heads; a pair of coil springs of different diameters, one within the other between the heads and having their ends respectively secured thereto; a unitary cylindrical filler of resilient material between the coil springs; a case of rubber circumscribing the outermost spring and secured to the said heads; and sheets of leather interposed between the springs and said filler and the case.

4. A joint of the character described comprising a pair of spaced heads each including a fitting and a fixture; an outer coil spring secured near its ends to the fittings of said heads respectively; an inner coil spring of relatively small diameter within the outer spring and secured near its ends to the fixtures of said head respectively; and a unitary cylindrical filler of resilient material between the inner and outer springs.

5. A joint of the character described comprising a pair of spaced heads each including a fitting and a fixture; an outer coil spring secured near its ends to the fittings of said heads respectively; an inner coil spring of relatively small diameter within the outer spring and secured near its ends to the fixtures of said head respectively; a unitary cylindrical filler of resilient material between the inner and outer springs; and a case of resilient material circumscribing the outer spring and joining the fittings of said heads.

6. A joint of the character described comprising a pair of spaced heads each including a fitting and a fixture; an outer coil spring secured near its ends to the fittings of said heads respectively; an inner coil spring of relatively small diameter within the outer spring ends secured near its ends to the fixtures of said head respectively; a unitary cylindrical filler of resilient material between the inner and outer springs; and a case of resilient material circumscribing the outer spring and joining the fittings of said heads, said case having a relatively thick portion intermediate the ends thereof for the purpose specified.

7. A joint of the character described comprising a pair of spaced heads each including a fitting and a fixture; an outer coil spring secured near its ends to the fittings of said heads respectively; an inner coil spring of relatively small diameter within the outer spring and secured near its ends to the fixtures of said head respectively; a unitary cylindrical filler of resilient material between the inner and outer springs; a flexible cable extending axially through the inner spring and secured to said fixtures; and a unitary core of resilient material between the cable and said inner spring.

8. A joint of the character described comprising a pair of spaced apart heads; a pair of coil springs of different diameters, one within the other between the heads and having their ends respectively secured thereto; a unitary cylindrical filler of resilient material between the coil springs; a plastic case circumscribing the outermost spring and secured to said heads; and a filler interposed between the case and said outermost spring.

9. A joint of the character described comprising a pair of spaced apart heads; a pair of coil springs of different diameters, one within the other between the heads and having their ends respectively secured thereto; a unitary cylindrical filler of resilient material between the coil springs; and sheets of hard flexible material interposed between the springs and said filler.

BENJAMIN T. MORGAN.
ALBERT K. A. CHRISTIAN.